(12) United States Patent
Ruengeler

(10) Patent No.: US 11,457,100 B2
(45) Date of Patent: Sep. 27, 2022

(54) CLASSIFICATION METHOD AND CLASSIFICATION MODULE

(71) Applicant: Rohde & Schwarz GmbH & Co. KG, Munich (DE)

(72) Inventor: Matthias Ruengeler, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 17/156,928

(22) Filed: Jan. 25, 2021

(65) Prior Publication Data

US 2022/0239769 A1 Jul. 28, 2022

(51) Int. Cl.
*H04L 69/323* (2022.01)
*G06K 9/62* (2022.01)
*H04L 69/22* (2022.01)

(52) U.S. Cl.
CPC ............ *H04L 69/323* (2013.01); *G06K 9/628* (2013.01); *H04L 69/22* (2013.01)

(58) Field of Classification Search
CPC ........ H04L 69/323; H04L 69/22; G06K 9/628
See application file for complete search history.

(56) References Cited

U.S. PATENT DOCUMENTS

| | | | |
|---|---|---|---|
| 10,187,497 B1* | 1/2019 | Sun | H04L 69/22 |
| 11,005,579 B1 | 5/2021 | Lorenzen | |
| 2015/0117428 A1* | 4/2015 | Lee | H04L 27/0008 370/338 |
| 2017/0223692 A1* | 8/2017 | Lim | H04L 5/0046 |
| 2017/0237543 A1* | 8/2017 | Lim | H04L 5/0048 370/476 |
| 2017/0279864 A1* | 9/2017 | Chun | H04L 1/1664 |
| 2017/0280462 A1* | 9/2017 | Chun | H04L 27/34 |
| 2017/0373901 A1* | 12/2017 | Lim | H04L 27/2613 |
| 2018/0007661 A1* | 1/2018 | Chun | H04L 27/26 |
| 2018/0048503 A1* | 2/2018 | Kim | H04L 27/2605 |
| 2018/0145811 A1* | 5/2018 | Park | H04L 27/2692 |
| 2018/0310330 A1* | 10/2018 | Chun | H04L 5/0091 |
| 2018/0317170 A1* | 11/2018 | Cariou | H04W 52/44 |
| 2018/0343096 A1* | 11/2018 | Kim | H04W 74/0808 |
| 2019/0090200 A1* | 3/2019 | Alpert | H04W 52/42 |
| 2019/0239219 A1* | 8/2019 | Huang | H04W 72/0446 |
| 2020/0136884 A1* | 4/2020 | Park | H04L 27/2602 |
| 2020/0177425 A1* | 6/2020 | Chen | H04L 5/0092 |

(Continued)

FOREIGN PATENT DOCUMENTS

EP 1625713 B1 9/2011
WO 2004102906 A1 11/2004

*Primary Examiner* — Khaled M Kassim
(74) *Attorney, Agent, or Firm* — Christensen O'Connor Johnson Kindness PLLC

(57) ABSTRACT

A classification method for classifying physical layer protocol data units (PPDU) for further RF quality analysis is described. The classification method Includes: receiving a plurality of PPDUs; processing the plurality of PPDUs by a PPDU classification algorithm, thereby obtaining at least one classification parameter being associated with at least one of at least two different classes; and augmenting the PPDUs with classification information based on the at least one classification parameter, thereby obtaining augmented PPDUs. Further, a classification apparatus comprising one or more circuits for classifying physical layer protocol data units (PPDU) for further RF quality analysis is described.

16 Claims, 3 Drawing Sheets

(56) References Cited

U.S. PATENT DOCUMENTS

| | | | |
|---|---|---|---|
| 2020/0196352 A1* | 6/2020 | Huang | H04W 8/26 |
| 2020/0305006 A1* | 9/2020 | Chen | H04W 16/18 |
| 2020/0314754 A1* | 10/2020 | Lim | H04W 52/0235 |
| 2021/0092771 A1* | 3/2021 | Ko | H04W 28/02 |
| 2021/0135792 A1* | 5/2021 | Cho | H04L 1/1887 |
| 2021/0204204 A1* | 7/2021 | Kim | H04W 48/10 |
| 2021/0212035 A1* | 7/2021 | Son | H04H 20/95 |
| 2021/0328745 A1* | 10/2021 | Lim | H04L 27/2666 |
| 2021/0367886 A1* | 11/2021 | Chen | H04L 45/74 |

* cited by examiner

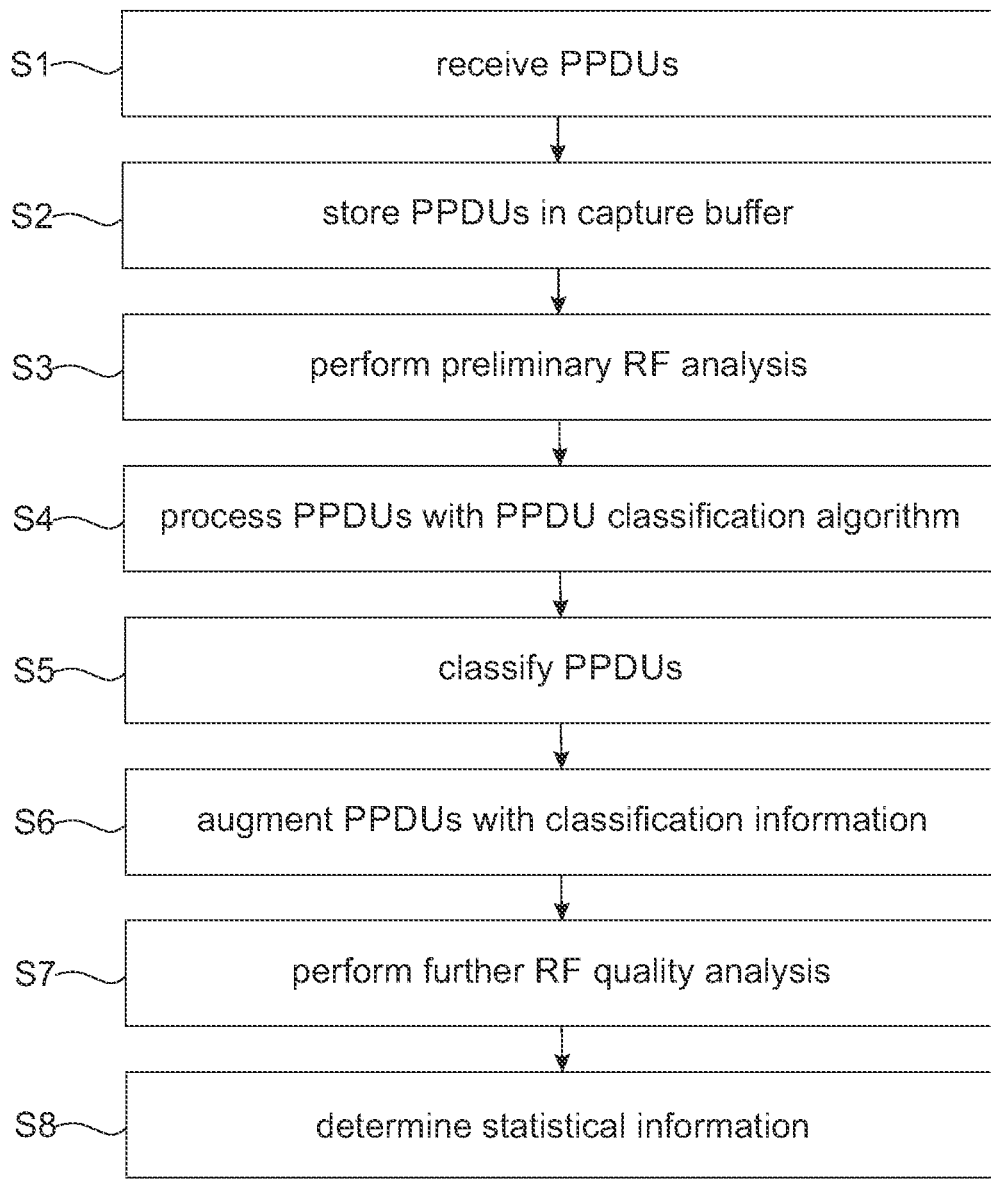

CLASSIFICATION METHOD AND CLASSIFICATION MODULE

FIELD OF THE DISCLOSURE

Embodiments of the present disclosure generally relate to a classification method for classifying physical layer protocol data units for further RF quality analysis. Embodiments of the present disclosure further relate to classification module for classifying physical layer protocol data units for further RF quality analysis.

BACKGROUND

Ultra wide band (UWB) devices are known in the state of the art that are used for so-called ranging by time-of-flight (TOF) measurements. The respective time-of-flight measurement is performed by two or more devices, wherein the respective distance is measured by a message ping-pong between the respective devices while calculating the time the packets needed to travel over the air.

The simplest method is called single sided two way ranging (SS-TWR). However, this method is inaccurate due to an allowed clock error up to 20 ppm. Therefore, the so-called double sided two way ranging (DS-TWR) is typically used in practice.

A further TOF measurement method is described in pending U.S. application Ser. No. 16/861,531, which is hereby incorporated by reference in its entirety.

For TOF measurements, it is important to classify data packets exchanged between the devices in order to determine which packet originates from which device.

For such TOF measurements, an RF analysis of UWB packets needs to be performed. Several TOF-packets are captured during the ranging process. Depending on their role in the ranging process, the TOF-packets are classified for further analysis.

In the state of the art, the individual data packets are classified manually, which is a rather time-consuming task that also requires a considerable amount of expertise from the user.

Accordingly, there is need for a classification method and a classification module that allow for a simpler classification of received data packets.

SUMMARY

Embodiments of the present disclosure provide a classification method for classifying physical layer protocol data units (PPDU) for further RF quality analysis. In an embodiment, the classification method comprises the following steps:

receiving a plurality of PPDUs;

processing the plurality of PPDUs by a PPDU classification algorithm, thereby obtaining at least one classification parameter being associated with at least one of at least two different classes; and augmenting the PPDUs with classification information based on the at least one classification parameter, thereby obtaining augmented PPDUs.

The received PPDUs may be saved in at least one capture buffer for further processing by the PPDU classification algorithm.

The PPDUs may be associated with UWB measurements. Thus, the PPDUs may also be called "packets" in that case.

However, it is to be understood that the classification methods according to the present disclosure is not restricted to UWB measurements, but may be applied to measurements with any packet-based protocol.

The classification methods according to the present disclosure is based on the idea to automatically determine the at least one classification parameter associated with the received PPDUs by the PPDU classification algorithm.

Thus, additional information on the PPDUs, namely the classification information, is determined automatically and is added to the PPDUs, such that the additional classification information can be used for a subsequent RF quality analysis of the augmented PPDUs.

Therein and in the following, the term "RF quality analysis" is understood to comprise measurements of parameters that are associated with a signal quality of the PPDUs, e.g. measurements of a signal-to-noise ratio of the PPDUs, a bandwidth of the PPDUs, a channel capacity, a data rate of the PPDUs, a data error rate of the PPDUs, a signal power of the PPDUs, and or a signal shape of the PPDUs. For example, the RF quality analysis may relate to TOF analysis measurements.

In other words, the determination of the at least one classification parameter does not require any knowledge about the measurement from a user. Moreover, the at least one classification parameter and the associated classification information are determined automatically, and thus in a fast manner.

According to an aspect of the present disclosure, the PPDUs are classified based on the at least one classification parameter. More precisely, the PPDUs are classified into at least one of the at least two different classes based on the at least one classification parameter. In some embodiments, the PPDUs may be classified into two or more classes. Therein, the PPDUs may be classified individually, i.e. independent of each other.

The at least one classification parameter determined may be compared with at least one classification criterion in order to classify the PPDUs.

In some embodiments, the classification information may comprise the respective class(es) of the PPDUs.

In an embodiment of the present disclosure, the PPDUs are processed by a signal analysis module composed of, for example, one or more circuits, thereby obtaining preliminary RF analysis results. In some embodiments, the preliminary RF analysis of the PPDUs may be performed before the PPDUs are processed by the PPDU classification algorithm. The results of the preliminary RF analysis, i.e. the preliminary RF analysis results, may be used for the classification of the PPDUs. In other words, the PPDUs are classified based on the at least one classification parameter and based on the preliminary RF analysis results.

The preliminary RF analysis may be a preliminary RF quality analysis.

In a further embodiment of the present disclosure, the augmented PPDUs are analyzed by a statistical technique, thereby obtaining additional statistical information regarding the augmented PPDUs. In some embodiments, separate statistical information may be determined for each different class of the PPDUs. In other words, the statistical information for each class is obtained by applying the statistical technique to all (augmented) PPDUs associated with the respective class.

The statistical technique may comprise determining a linear mean, a logarithmic mean, a maximum, a minimum, an expectation value and/or a standard deviation of classification parameters and/or RF analysis results associated with the respective class.

According to another aspect of the present disclosure, the augmented PPDUs are forwarded to a signal analysis module for further RF quality analysis. In an embodiment, the signal analysis module includes one or more circuits configured to perform measurements associated with the RF quality analysis at least partially automatic, for example fully automatic. For example, the measurements may relate to TOF analysis measurements.

In a further embodiment of the present disclosure, the augmented PPDUs are forwarded to a user for further RF quality analysis. The user may perform measurements associated with the RF quality analysis at least partially manual, for example fully manual. However, the RF quality analysis measurements are considerably easier to perform due to the classification information provided in the augmented PPDUs.

In some embodiments, the RF quality analysis may be performed partially automatic by the signal analysis module and partially manual by the user.

According to an aspect of the present disclosure, the classification parameter is associated with an electronic device generating the respective PPDU. In other words, the classification information may comprise information on which electronic device has generated the respective PPDU. For example, the classification information may relate to whether the respective device is established as an UWB anchor or as an UWB tag.

In some embodiments, the classification parameter relates to at least one of an order of appearance with respect to a time of receipt, an order of appearance with respect to another PPDU, a data content, a power of a SYNC-section, a power of a payload portion, a power of a packet, an amplitude response ripple, a phase response ripple, a center frequency offset, a chip frequency offset, a pulse NSME, a symbol modulation accuracy, a symbol EVM, a chip EVM, a symbol time jitter, a symbol phase jitter, a chip time jitter, a chip phase jitter, a PHR checksum test, an RMarker-flag, a code sequence length, a delta length, a code index, a PDSU length, sync symbols, data rate, a header portion, or a header flag.

Therein, the term "data content" may relate to whether the respective PPDU comprises known data. The PHR checksum test may be passed or may be failed. The RMarker-flag may be set or may be not set.

In a further embodiment of the present disclosure, at least two different classification parameters are determined by the PPDU classification algorithm. Accordingly, classification information associated with at least two different classes or sub-classes is determined and added to the PPDUs. Thus, additional classification information is available for the subsequent RF quality analysis.

According to another aspect of the present disclosure, the at least two different classification parameters are determined according to a hierarchy. In other words, at least two different layers of classification are provided, such that the PPDUs may each be classified into at least one of at least two different classes, and subsequently into at least one of at least two different sub-classes. For example, the PPDUs may first be classified according to their order of appearance and then according to another property, such as the respective EVM of the PPDUs.

In some embodiments, classification criteria associated with the at least two different classification parameters are combined based on a logical connection. In other words, a classification filter may be provided for the PPDUs by combining the classification criteria by the logical connection(s). Thus, the PPDUs have to fulfill a certain combination of classification criteria in order to be classified into a specific class.

The individual classification criteria may be combined with "and", "or", "Xor", "not", "smaller than", "bigger than", "equal to", etc.

The combination of classification criteria may be preset. For example, the combination of classification criteria may be downloaded from a corresponding cloud service.

Alternatively or additionally, a user may set and/or modify the combination of classification criteria.

According to an aspect of the present disclosure, the PPDUs are classified based on the at least two different classification parameters, wherein the at least two different classification parameters are weighted in order to classify the PPDUs. Thus, classification parameters associated with different properties of the PPDUs may be weighted differently for the classification of the PPDUs. For example, the order of appearance of the PPDUs may be way higher than whether and RMarker-flag is set, which may in turn be weighted higher than whether the respective PPDU comprises known data.

Embodiments of the present disclosure further provide a classification module (e.g., inter alia one or more circuits) for classifying physical layer protocol data units (PPDU) for further RF quality analysis. The classification module comprises a signal input, and an artificial intelligence sub-module. The signal input is configured to receive a plurality of PPDUs. The artificial intelligence sub-module includes one or more circuits configured to process the plurality of PPDUs by a PPDU classification algorithm, thereby obtaining at least one classification parameter being associated with at least one of at least two different classes. The artificial intelligence sub-module includes one or more circuits configured to augment the PPDUs with classification information based on the at least one classification parameter, thereby obtaining augmented PPDUs.

In some embodiments, the classification module is configured to perform the classification method described above.

The classification module may comprise a capture buffer being configured to store the received PPDUs.

Regarding the further advantages and properties of the classification module, reference is made to the explanations given above with respect to the classification method, which also hold for the classification module and vice versa.

According to an aspect of the present disclosure, the artificial intelligence sub-module includes one or more circuits configured to classify the PPDUs based on the at least one classification parameter. More precisely, the artificial intelligence sub-module includes one or more circuits configured to classify the PPDUs into at least one of the at least two different classes based on the at least one classification parameter. In some embodiments, the artificial intelligence sub-module includes one or more circuits configured to classify the PPDUs into two or more classes. Therein, the PPDUs may be classified individually, i.e. independent of each other.

In some embodiments, the artificial intelligence sub-module includes one or more circuits configured to compare the at least one classification parameter determined with at least one classification criterion in order to classify the PPDUs.

According to another aspect of the present disclosure, the classification module further comprises a signal analysis sub-module. In an embodiment, the signal analysis sub-module includes one or more circuits configured to perform an automatic RF quality analysis of the augmented PPDUs. In some embodiments, the signal analysis sub-module includes one or more circuits configured to perform measurements associated with the RF quality analysis at least partially automatic, for example fully automatic. For example, the measurements may relate to TOF analysis measurements.

In an embodiment of the present disclosure, the signal analysis sub-module includes one or more circuits configured to process the PPDUs, thereby obtaining preliminary RF analysis results. In some embodiments, the preliminary RF analysis of the PPDUs may be performed before the PPDUs are processed by the PPDU classification algorithm. The results of the preliminary RF analysis, i.e. the preliminary RF analysis results, may be used for the classification of the PPDUs. In other words, the PPDUs may be classified by the artificial intelligence sub-module based on the at least one classification parameter and based on the preliminary RF analysis results.

In a further embodiment of the present disclosure, the signal analysis sub-module includes one or more circuits configured to analyze the augmented PPDUs by a statistical technique, thereby obtaining additional statistical information regarding the augmented PPDUs. In some embodiments, separate statistical information may be determined for each different class of the PPDUs. In other words, the statistical information for each class is obtained by applying the statistical technique to all (augmented) PPDUs associated with the respective class.

The statistical technique may comprise determining a linear mean, a logarithmic mean, a maximum, a minimum, an expectation value and/or a standard deviation of classification parameters and/or RF analysis results associated with the respective class.

The classification module may further comprise a user interface. The user interface may be configured to display the augmented PPDUs. The user may perform measurements associated with the RF quality analysis at least partially manual based on the augmented PPDUs displayed on the display, for example fully manual. However, the RF quality analysis measurements are considerably easier to perform due to the classification information provided in the augmented PPDUs.

According to an aspect of the present disclosure, the artificial intelligence sub-module is established as a machine-learning module. Accordingly, the artificial intelligence sub-module may be trained to automatically determine the at least one classification parameter, to automatically determine the classification information associated with the at least one classification parameter, and/or to automatically augment the PPDUs with the classification information.

In some embodiments, the machine-learning module is trained with labelled training data. The labelled training data comprises a plurality of PPDUs. Moreover, the labelled training data comprises at least one actual classification parameter associated with the respective PPDUs, actual classification information associated with the respective PPDUs, and/or an actual class to which the respective PPDUs belong. Thus, the machine-learning module may process the received PPDUs as described above, and the result may be compared with the correct results given in the labelled training data. Computational parameters of the machine-learning module may be adapted based on the comparison.

In an embodiment of the present disclosure, the classification parameter is associated with an electronic device generating the respective PPDU. In other words, the classification information may comprise information on which electronic device has generated the respective PPDU. For example, the classification information may relate to whether the respective device is established as an UWB anchor or as an UWB tag.

In some embodiments, the classification parameter relates to at least one of an order of appearance with respect to a time of receipt, an order of appearance with respect to another PPDU, a data content, a power of a SYNC-section, a power of a payload portion, a power of a packet, an amplitude response ripple, a phase response ripple, a center frequency offset, a chip frequency offset, a pulse NSME, a symbol modulation accuracy, a symbol EVM, a chip EVM, a symbol time jitter, a symbol phase jitter, a chip time jitter, a chip phase jitter, a PHR checksum test, an RMarker-flag, a code sequence length, a delta length, a code index, a PDSU length, sync symbols, data rate, a header portion, or a header flag.

In a further embodiment of the present disclosure, the artificial intelligence sub-module includes one or more circuits configured to determine at least two different classification parameters by the PPDU classification algorithm. Accordingly, classification information associated with at least two different classes or sub-classes is determined and added to the PPDUs. Thus, additional classification information is available for the subsequent RF quality analysis.

According to an aspect of the present disclosure, the artificial intelligence sub-module includes one or more circuits configured to determine the at least two different classification parameters according to a hierarchy. In other words, at least two different layers of classification are provided, such that the PPDUs may each be classified into at least one of at least two different classes, and subsequently into at least one of at least two different sub-classes. For example, the PPDUs may first be classified according to their order of appearance and then according to another property, such as the respective EVM of the PPDUs.

In some embodiments, the artificial intelligence sub-module includes one or more circuits configured to combine classification criteria associated with the at least two different classification parameters by a logical connection. In other words, a classification filter may be provided for the PPDUs by combining the classification criteria by the logical connection(s). Thus, the PPDUs have to fulfill a certain combination of classification criteria in order to be classified into a specific class.

The individual classification criteria may be combined with "and", "or", "Xor", "not", "smaller than", "bigger than", "equal to", etc.

The combination of classification criteria may be preset. For example, the combination of classification criteria may be downloaded from a corresponding cloud service.

Alternatively or additionally, a user may set and/or modify the combination of classification criteria.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

FIG. 3 shows a flow chart of a classification method according to an embodiment of the present disclosure.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
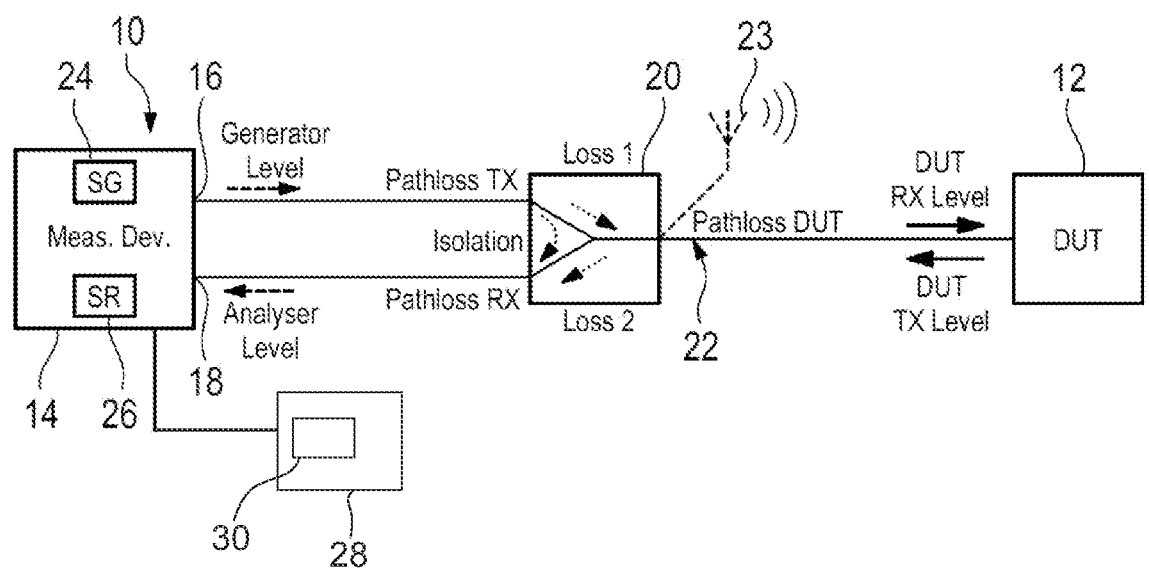
FIG. 1 schematically shows a representative test system in accordance with the present disclosure.

FIG. 1 shows a test system 10 for performing a run-time measurement to calibrate a device used for time-of-flight measurement, which is represented by a device under test 12 ("DUT"). The test system 10 also comprises a measurement device 14 ("Meas. Dev.") that has a transmission port 16 as well as a reception port 18. The measurement device 14 is connected with a directive component 20 that is established by a coupler, for instance. The directive component 20 has three ports in total via which the directive component 20 is connected with the transmission port 16, the reception port 18 as well as the device under test 12.

In the shown embodiment, the device under test 12 and the directive component 20 are interconnected with each other by a cable 22. However, the directive component 20 may also be connected with an antenna 23 via its third port as indicated by the dashed lines in FIG. 1.

The test system 10 further comprises a signal generator 24 ("SG") as well as a signal receiver 26 ("SR") that are associated with the measurement device 14 in the shown embodiment.

Accordingly, the measurement device 14 is able to generate a signal that is forwarded to the directive component 20 for being forwarded to the device under test 12. This is illustrated by the respective arrow labelled with "Generator Level". The directive component 20 is able to split a reverse signal from the signal generated that is forwarded to the signal receiver 26 of the measurement device 14. This is illustrated by the respective arrow labelled with "Analyser Level".

In addition, the signal generated is forwarded to the device under test 12 via the directive component 20 by the cable 22 such that the device under test 12 receives the signal generated. This is illustrated by the respective arrow labelled with "DUT RX Level". The device under test 12 processes the signal generated and generates a response that is forwarded to the measurement device 14 via the directive component 20. This is illustrated by the respective arrow labelled with "DUT TX Level". The response of the device under test 12 is received by the signal receiver 26 of the measurement device 14 as well.

As shown in FIG. 1, an analysis module 28 is also provided. In an embodiment, the analysis module 28 includes one or more circuits (e.g., circuitry). The analysis module 28 is connected with the measurement device 14. Alternatively, the analysis module 28 may be integrated within the measurement device 14.

In some embodiments, the term "module," "sub-module" or "unit" as used herein refers to a combination of hardware (e.g. a processor such as an integrated circuit or other circuitry) and software (e.g. machine- or processor-executable instructions, commands, or code such as firmware, programming, or object code). Furthermore, a combination of hardware and software may include hardware only (i.e. a hardware element with no software elements), software hosted at hardware (e.g. software that is stored at a memory and executed or interpreted at a processor), or hardware with the software hosted thereon. In some embodiments, the hardware may, inter alia, comprise a CPU, a GPU, an FPGA, an ASIC, or other types of electronic circuitry.

In general, the test system 10 is configured to perform time-of-flight (TOF) measurements, for example in order to calibrate the device under test 12. More details on the TOF measurements are given in U.S. application Ser. No. 16/861,531, which is hereby incorporated by reference in its entirety.

For such TOF measurements, it is important to classify data packets exchanged between the devices in order to determine which packet originates from which device.

Figure 2:
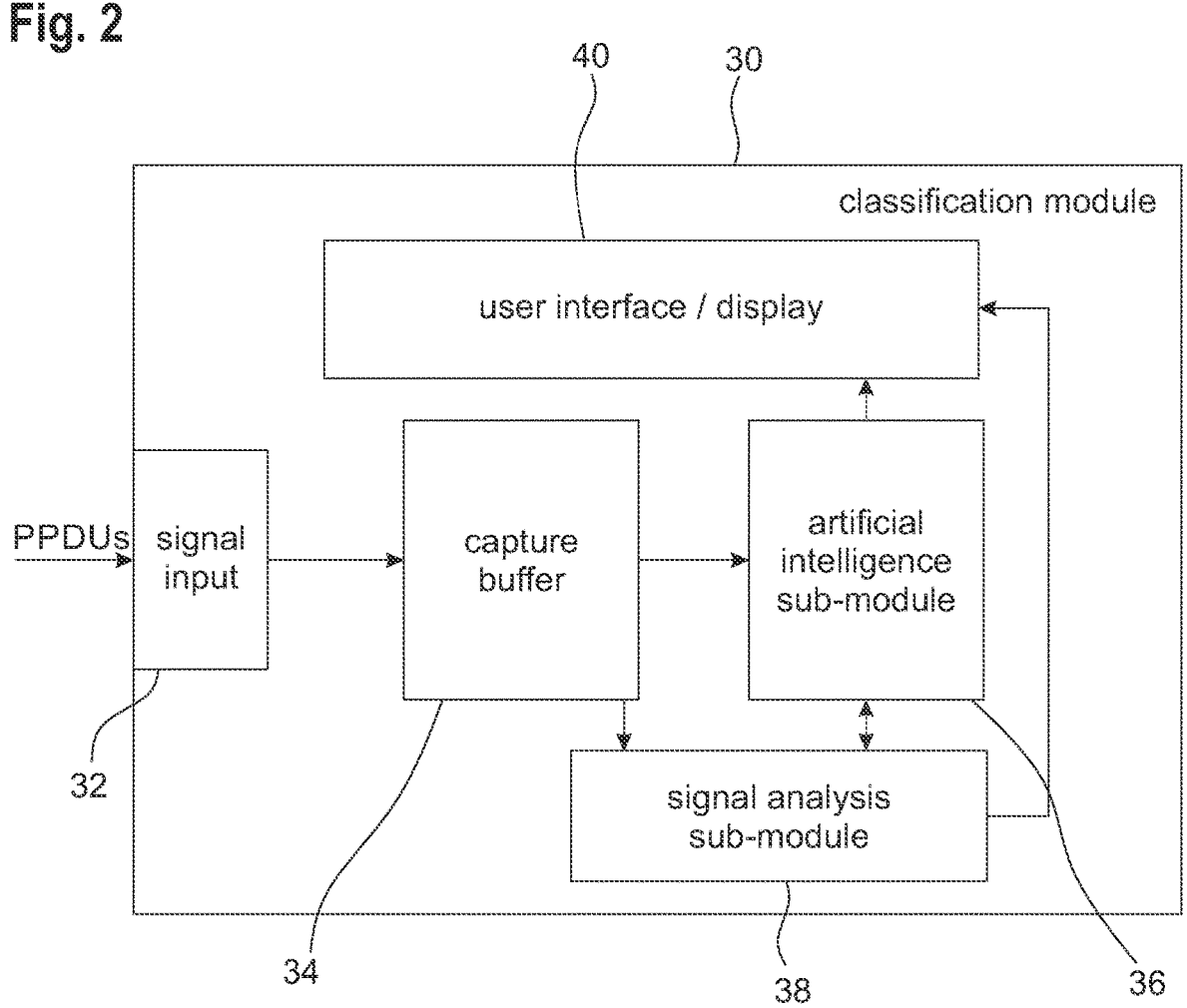
FIG. 2 schematically shows a classification module according to an embodiment of the present disclosure.

For this purpose, the analysis module 28 comprises a classification module 30, which is shown in more detail in FIG. 2. In an embodiment, the classification module 30 includes one or more circuits (e.g., circuitry).

The classification module 30 comprises a signal input 32, a capture buffer 34, an artificial intelligence sub-module 36, a signal analysis sub-module 38, and a user interface 40.

The artificial intelligence sub-module 36 is established as a machine-learning module being trained to have a certain functionality. The functionality of the artificial intelligence sub-module 36 will be described in more detail below.

The capture buffer 34 is connected to the signal input 32 downstream of the signal input 32. The artificial intelligence sub-module 36 and the signal analysis sub-module 38 are each connected to the capture buffer 34 downstream of the capture buffer 34. The signal analysis sub-module 38 and the user interface 40 are each connected to the artificial intelligence sub-module 36 downstream of the signal analysis sub-module 38. Optionally, the user interface 40 may be connected with the signal analysis sub-module 38.

The classification module 30 includes one or more circuits configured to perform, for example, a classification method for classifying physical layer protocol data units (PPDU) for further RF quality analysis. One example of the classification method is described in the following with reference to FIG. 3.

A plurality of PPDUs is received by the signal input 32 (step S1). The PPDUs may be associated with UWB measurements. Thus, the PPDUs may also be called "packets" in that case. However, it is to be understood that the classification method described in the following is not restricted to UWB measurements, but may be applied to measurements with any packet-based protocol.

The received PPDUs are stored in the capture buffer 34 for further processing (step S2).

The received PPDUs are then forwarded from the capture buffer 34 to the artificial intelligence sub-module 36 and to the signal analysis sub-module 38.

The PPDUs are processed by the signal analysis sub-module 38, thereby obtaining preliminary RF analysis results (step S3). In some embodiments, the preliminary RF analysis of the PPDUs may be performed before the PPDUs are processed by the artificial intelligence sub-module 36, as described below. The preliminary RF analysis results may be associated with a preliminary RF quality analysis.

The artificial intelligence sub-module 36 processes the plurality of PPDUs by a PPDU classification algorithm, thereby obtaining at least one classification parameter being associated with at least one of at least two different classes (step S4).

Therein, the at least one classification parameter is determined for each PPDU individually. In other words, the at least one classification parameter is determined for each PPDU independent of the other PPDUs.

The at least one classification parameter may be associated with an electronic device generating the respective PPDU. In other words, the classification information may comprise information on which electronic device has generated the respective PPDU. For example, the classification information may relate to whether the respective device is established as an UWB anchor or as an UWB tag.

In the particular example of FIG. 1, the classification parameter may be indicative of whether the device under test 12 has generated the respective PPDU, or whether the measurement device 14 has generated the respective e PPDU.

Alternatively or additionally, the classification parameter relates to at least one of an order of appearance with respect to a time of receipt, an order of appearance with respect to another PPDU, a data content, a power of a SYNC-section, a power of a payload portion, a power of a packet, an amplitude response ripple, a phase response ripple, a center frequency offset, a chip frequency offset, a pulse NSME, a symbol modulation accuracy, a symbol EVM, a chip EVM, a symbol time jitter, a symbol phase jitter, a chip time jitter, a chip phase jitter, a PHR checksum test, an RMarker-flag, a code sequence length, a delta length, a code index, a PDSU length, sync symbols, data rate, a header portion, or a header flag.

Therein, the term "data content" may relate to whether the respective PPDU comprises known data. The PHR checksum test may be passed or may be failed. The RMarker-flag may be set or may be not set.

Optionally, at least two different classification parameters may be determined by the PPDU classification algorithm for each of the PPDUs.

The at least two different classification parameters may be determined according to a hierarchy. In other words, at least two different layers of classification are provided, such that the PPDUs may each be classified into at least one of at least two different classes, and into at least one of at least two different sub-classes in the classification step described below.

Based on the at least one determined classification parameter, each of the PPDUs is classified into at least one of the at least two different classes (step S5).

Optionally, each of the PPDUs may be classified based on the preliminary RF analysis results obtained in step S3.

In other words, the PPDUs may be classified based on the at least one determined classification parameter and based on the preliminary RF analysis results.

In some embodiments, the PPDUs may be classified into two or more classes. Therein, the PPDUs may be classified individually, i.e. independent of each other.

The at least one classification parameter determined may be compared with at least one classification criterion in order to classify the PPDUs. In other words, the artificial intelligence sub-module 36 may check whether the respective classification parameter fulfills the respective classification criterion.

For example, the artificial intelligence sub-module 36 may check whether the respective classification parameter is smaller than a predefined threshold or bigger than a predefined threshold, or whether the respective classification parameter lies within a predetermined interval.

If more than one classification parameter is determined for each PPDU, classification criteria associated with the at least two different classification parameters may be combined based on a logical connection. In other words, a classification filter may be provided for the PPDUs by combining the classification criteria by the logical connection(s).

Thus, the PPDUs have to fulfill a certain combination of classification criteria in order to be classified into a specific class or sub-class.

The individual classification criteria may be combined with "and", "or", "Xor", "not", "smaller than", "bigger than", "equal to", etc.

The combination of classification criteria may be preset. For example, the combination of classification criteria may be downloaded from a corresponding cloud service.

Alternatively or additionally, a user may set and/or modify the combination of classification criteria via the user interface 40.

Optionally, the at least two different classification parameters may be weighted in order to classify the PPDUs. Thus, classification parameters associated with different properties of the PPDUs may be weighted differently for the classification of the PPDUs.

For example, the order of appearance of the PPDUs may be way higher than whether and RMarker-flag is set. Whether the RMarker-flag is set may be weighted higher than whether the respective PPDU comprises known data, etc.

Based on the at least one determined classification parameter, the PPDUs are augmented with classification information, thereby obtaining augmented PPDUs (step S6).

In general, the classification information relates to information regarding the at least one class to which the respective PPDU belongs, for example to the several classes and/or sub-classes the respective PPDU belongs to.

The augmented PPDUs are forwarded to the signal analysis sub-module 38 and/or to the user interface 40 for further RF quality analysis (step S7). The signal analysis sub-module 38 may perform measurements associated with the RF quality analysis at least partially automatic, for example fully automatic. For example, the measurements may relate to TOF analysis measurements.

Therein and in the following, the term "RF quality analysis" is understood to comprise measurements of parameters that are associated with a signal quality of the PPDUs, e.g. measurements of a signal-to-noise ratio of the PPDUs, a bandwidth of the PPDUs, a channel capacity, a data rate of the PPDUs, a data error rate of the PPDUs, a signal power of the PPDUs, and or a signal shape of the PPDUs.

Alternatively or additionally, the augmented PPDUs may be visualized on a display of the user interface 40. The user may perform measurements associated with the RF quality analysis at least partially manual based on the visualized augmented PPDUs, for example fully manual.

In some embodiments, the RF quality analysis may be performed partially automatic by the signal analysis sub-module 38 and partially manual by the user.

With the classification method described above, the PPDUs are classified and corresponding classification information is determined completely automatically.

Thus, a user does not have to perform the classification manually. Accordingly, the expertise required from a user in order to perform the RF quality analysis is reduced significantly.

Moreover, the subsequent RF quality analysis of the PPDUs is facilitated considerably due to the additional information available for the analysis, namely the classification information.

Optionally, the augmented PPDUs may be analyzed by a statistical technique via the signal analysis sub-module 38, thereby obtaining additional statistical information regarding the augmented PPDUs (step S8).

In some embodiments, separate statistical information may be determined for each different class of the PPDUs. In other words, the statistical information for each class is obtained by applying the statistical technique to all (augmented) PPDUs associated with the respective class.

The statistical technique may comprise determining a linear mean, a logarithmic mean, a maximum, a minimum, an expectation value and/or a standard deviation of classification parameters and/or RF analysis results associated with the respective class.

The statistical information may be visualized on the display of the user interface 40.

Certain embodiments disclosed herein, for example the respective module(s) or sub-modules, utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof.

In an embodiment, circuitry includes hardware circuit implementations (e.g., implementations in analog circuitry, implementations in digital circuitry, and the like, and combinations thereof). In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

In some examples, the functionality described herein can be implemented by special purpose hardware-based computer systems or circuits, etc., or combinations of special purpose hardware and computer instructions.

Of course, in some embodiments, two or more of the components described above, or parts thereof, can be integrated or share hardware and/or software, circuitry, etc. In some embodiments, these components, or parts thereof, may be grouped in a single location or distributed over a wide area. In circumstances were the components are distributed, the components are accessible to each other via communication links.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A classification method for classifying physical layer protocol data units (PPDU) for further radio frequency (RF) quality analysis, the classification method comprising:
    receiving, by a classification circuit, a plurality of PPDUs, wherein the classification circuit is integrated into a measurement device or connected with a measurement device;
    processing, by the classification circuit, the plurality of PPDUs by a PPDU classification algorithm, thereby obtaining at least one classification parameter being associated with at least one of at least two different classes; and
    augmenting the PPDUs with classification information based on the at least one classification parameter such that the classification information is added to the PPDUs, thereby obtaining augmented PPDUs, wherein the classification information added to the PPDUs is not comprised in the received plurality of PPDUs;
    wherein at least two different classification parameters are determined by the PPDU classification algorithm;
    wherein the at least two different classification parameters are determined according to a hierarchy; and
    wherein classification criteria associated with the at least two different classification parameters are combined based on a logical connection.

2. The classification method of claim 1, wherein the PPDUs are classified based on the at least one classification parameter.

3. The classification method of claim 1, wherein the PPDUs are processed by a signal analysis circuit, thereby obtaining preliminary RF analysis results.

4. The classification method of claim 1, wherein the augmented PPDUs are analyzed by a statistical technique, thereby obtaining additional statistical information regarding the augmented PPDUs.

5. The classification method of claim 1, wherein the augmented PPDUs are forwarded to a signal analysis circuit for further RF quality analysis.

6. The classification method of claim 1, wherein the augmented PPDUs are forwarded to a user for further RF quality analysis.

7. The classification method of claim 1, wherein the classification parameter is associated with an electronic device generating the respective PPDU.

8. The classification method of claim 1, wherein the classification parameter relates to at least one of an order of appearance with respect to a time of receipt, an order of appearance with respect to another PPDU, a data content, a power of a SYNC-section, a power of a payload portion, a power of a packet, an amplitude response ripple, a phase response ripple, a center frequency offset, a chip frequency offset, a pulse NSME, a symbol modulation accuracy, a symbol EVM, a chip EVM, a symbol time jitter, a symbol phase jitter, a chip time jitter, a chip phase jitter, a PHR checksum test, an RMarker-flag, a code sequence length, a delta length, a code index, a PDSU length, sync symbols, data rate, a header portion, and a header flag.

9. The classification method of claim 1, wherein the PPDUs are classified based on the at least two different classification parameters, and wherein the at least two different classification parameters are weighted in order to classify the PPDUs.

10. A classification circuit for classifying physical layer protocol data units (PPDU) for further radio frequency (RF) quality analysis, the classification circuit comprising:
a signal input, and an artificial intelligence sub-circuit, the signal input being configured to receive a plurality of PPDUs,
the artificial intelligence sub-circuit being configured to process the plurality of PPDUs by a PPDU classification algorithm, thereby obtaining at least one classification parameter being associated with at least one of at least two different classes, and
the artificial intelligence sub-circuit being configured to augment the PPDUs with classification information based on the at least one classification parameter such that the classification information is added to the PPDUs, thereby obtaining augmented PPDUs wherein the classification information added to the PPDUs is not comprised in the received plurality of PPDUs;
wherein the artificial intelligence sub-circuit is configured to determine at least two different classification parameters by the PPDU classification algorithm;
wherein the artificial intelligence sub-circuit is configured to determine the at least two different classification parameters according to a hierarchy; and
wherein the artificial intelligence sub-circuit is configured to combine classification criteria associated with the at least two different classification parameters by a logical connection.

11. The classification circuit of claim 10, wherein the artificial intelligence sub-circuit is configured to classify the PPDUs based on the at least one classification parameter.

12. The classification circuit of claim 10, wherein the classification circuit further comprises a signal analysis sub-circuit, the signal analysis sub-circuit being configured to perform an automatic RF quality analysis of the augmented PPDUs.

13. The classification circuit of claim 10, wherein the classification circuit further comprises a user interface, the user interface being configured to display the augmented PPDUs.

14. The classification circuit of claim 10, wherein the artificial intelligence sub-circuit is established as a machine-learning circuit.

15. The classification circuit of claim 14, wherein the machine-learning circuit is trained with labelled training data.

16. The classification circuit of claim 10, wherein the classification parameter is associated with an electronic device generating the respective PPDU.

* * * * *